(12) United States Patent
Hirose

(10) Patent No.: US 6,907,529 B1
(45) Date of Patent: Jun. 14, 2005

(54) DOCUMENT MANAGEMENT SYSTEM

(75) Inventor: Takashi Hirose, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/437,924

(22) Filed: Nov. 10, 1999

(30) Foreign Application Priority Data

Nov. 12, 1998 (JP) .......................................... 10-336474

(51) Int. Cl.$^7$ ............................................... G06F 11/30
(52) U.S. Cl. ...................................... 713/200; 713/176
(58) Field of Search ................................ 713/200, 176, 713/156, 186, 161, 183; 380/51, 50; 382/115, 100, 123; 707/104.1, 103 R, 103, 205; 705/51; 715/541; 358/1.15, 403, 1.14

(56) References Cited

U.S. PATENT DOCUMENTS

| | | | | |
|---|---|---|---|---|
| 4,286,255 A | * | 8/1981 | Siy | 382/123 |
| 5,490,217 A | * | 2/1996 | Wang et al. | 380/51 |
| 5,606,609 A | * | 2/1997 | Houser et al. | 713/179 |
| 5,818,955 A | * | 10/1998 | Smithies et al. | 382/115 |
| 6,212,504 B1 | * | 4/2001 | Hayosh | 705/64 |
| 6,243,480 B1 | * | 6/2001 | Zhao et al. | 382/100 |
| 6,401,206 B1 | * | 6/2002 | Khan et al. | 713/176 |
| 6,484,933 B1 | * | 11/2002 | Zimmerman et al. | 235/375 |
| 6,557,102 B1 | * | 4/2003 | Wong et al. | 713/176 |

FOREIGN PATENT DOCUMENTS

| | | | | |
|---|---|---|---|---|
| JP | 61-204766 | 9/1986 | | |
| JP | 3-136165 | 6/1991 | | |
| JP | 3-149651 | 6/1991 | | |
| JP | 5-101081 | 4/1993 | | |
| JP | 5-151343 | 6/1993 | | |
| JP | 5-216975 | 8/1993 | | |
| JP | 6-119363 | 4/1994 | | |
| JP | 06119363 A | * | 4/1994 | ........... G06F/15/22 |
| JP | 6-305200 | 11/1994 | | |
| JP | 6-348704 | 12/1994 | | |
| JP | 9-62750 | 3/1997 | | |
| JP | 9-114894 | 5/1997 | | |
| JP | 9-198437 | 7/1997 | | |
| JP | 10143414 A | * | 5/1998 | ........... G06F/12/00 |
| JP | 10-143414 | 5/1998 | | |
| JP | 63-120364 | 5/1998 | | |

* cited by examiner

Primary Examiner—Kim Vu
Assistant Examiner—Beemnet W Dada
(74) Attorney, Agent, or Firm—Dickstein, Shapiro, Morin & Oshinsky, LLP.

(57) ABSTRACT

A computer network system has a document data storage system for storing an electronic document having therein a signature image in association with a signer ID number, and an attest data storage system for storing an attest data including a registered signature image data. The document data storage system receives the registered signature image data based on the signer ID number from the attest data storage system, and stores the registered imaged data in association with the electronic document. Examination of the signature can be easily conducted for attesting the electronic document.

8 Claims, 3 Drawing Sheets

DOCUMENT MANAGEMENT SYSTEM

BACKGROUND OF THE INVENTION (a) Field of the Invention

The present invention relates to a document management system and, more particularly, to a document management system for handling the attest data for authorizing electronic documents in a computer system.

(b) Description of a Related Art

There have been increasing demands to make the image synthesizes a signature to an electronic document and to obtain the print output. A computer system using a network can be used as an open-ended and reliable system if the signature image data can be used in the computer system for authorizing the electronic document.

There is a prior art describing a signature image data unit and document data unit in a closed computer system, not used independently in network, and there is a problem in examining the correctness of a personal seal or signature (referred to as simply signature hereinafter).

For instance, Patent Publication JP-A-6-119363 describes such a document management system. The described system includes a document data storage unit for storing created electronic documents, a signature image data storage unit for storing the signature image data in association with the signer ID number, (two units being integrated in a same computer system), a protective attribute generator for attaching a protective attribute for protecting the documents stored in the document data storage unit by prohibiting the change of the documents, an attest information generator for attaching attest information including signer ID number to the electronic document stored in the document data storage unit in response to the operation by the operator or thereby allow the protective attribute generator to attach the protective attribute to the electronic document, and a signal processor for reading, based on the signer ID number, the electronic document stored in the document data storage unit and attached with the attest information and the protective attribute to synthesize the image data stored in the signature image data storage unit corresponding to the signer ID number onto the electronic document and output the same to an output unit. In the output, document data and the signature image are printed, the signer ID number is not printed.

In the described system, it is recited that the system stores beforehand a signature image data for authorizing the electronic document created by a word processor or electronic mail and delivers the document data after synthesizing the document data with the signature image data. It is also recited that the electronic document is protected from an unauthorized approval or a wrong change thereof after the authorization by attaching the attest information to the electronic document, whereby an unqualified person is prohibited from illegal authorization or willful change of the electronic document by a criminal or illegal deed.

In the described system, however, there is a problem in that it is difficult in fact to judge the correctness of the signature image due to the ambiguity of the printed data of the signature image due to the of the sharpness of the printed matter and the signature image data storage unit is not independent of document data storage unit computer system, so it is difficult for the plural signers to access to the plural signature image data system in computer network independently and register signature images after the signer's secured approval, and attach those signature image data to the same document data individually.

SUMMARY OF THE INVENTION

There have been increasing demands for examining the correctness of a personal seal or signature (referred to as simply signature hereinafter) used for authorizing the electronic documents transferred in the computer system network system and the printing thereof. A computer system using a network can be used as an open-ended and reliable system if the signature image data can be used in the computer system network system for authorizing the electronic document such as a contract with a sufficient reliability.

In view of the above, it is an object of the present invention to provide an open-ended and reliable document management system which is capable of judging the correctness of the printed or displayed signature data with ease and a reliable manner by storing the signature data and the electronic document in separate units while also storing the relationship therebetween.

The present invention provides a document management system including a plurality of computer systems coupled together by a network, at least one of the computer systems delivering an electronic document attached with a signature image for authorizing the electronic document by a signer, a document data storage system coupled to the network for storing the electronic document supplied from the at least one of the computer systems, and an attest data storage system coupled to the network for storing the signature image, the document data storage system storing bar codes of a document number of the electronic document stored in the document data storage system and an ID number of the attest data storage system storing the attest data, the attest data storage system storing bar codes of the document number and an ID number of the document data storage system.

In accordance with the management system of the present invention, the provision of bar codes of the ID numbers of the systems and the document number enables the document data storage system to easily retrieve the attest data from the attest data storage system, thereby providing an open-ended and reliable document management system which is capable of judging the correctness of the printed or displayed signature data with ease and a reliable manner.

In addition, independence of the systems is assured in the system environment, which assists construction of an open-ended system. The document number supplied to the attest data storage system and the attest data including the number of times of authorization by the signer may prevent illegal documents so long as the signer confirms the document and the number of times.

The present invention also provides a method for managing an electronic document in a computer network system including the steps of registering a signature image data in association with a signer ID number, temporarily storing primary document data including an electronic document having therein a signature image, in association with the signer ID number, transferring the registered signature image data based on the signer ID number in the primary document data, and attaching the registered signature image to the primary document data to complete a secondary document data to be stored.

The above and other objects, features and advantages of the present invention will be more apparent from the following description, referring to the accompanying drawings.

PREFERRED EMBODIMENTS OF THE INVENTION

Now, the present invention is more specifically described with reference to accompanying drawings.

Figure 1:
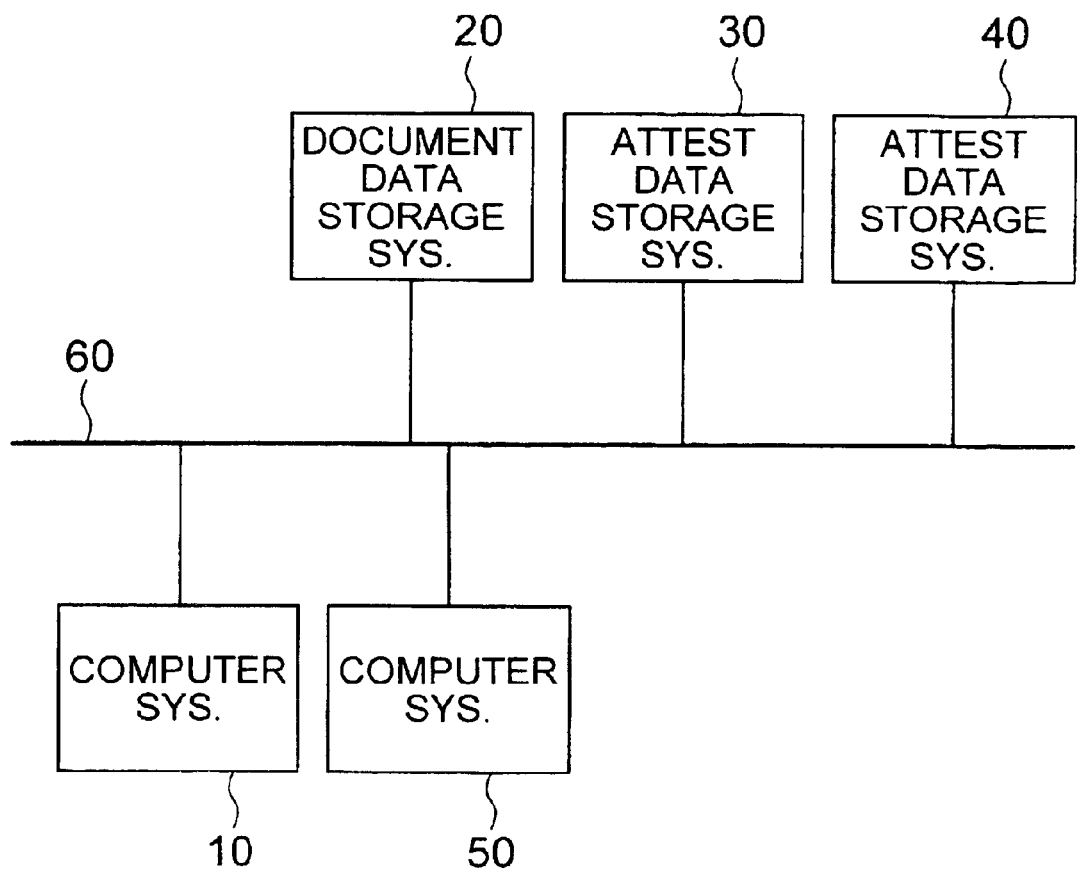
FIG. 1 is a block diagram of a document management system according to an embodiment of the present invention.

Referring to FIG. 1, a document management system according to an embodiment of the present invention includes a plurality of computer systems such as 10 and 50, one or more of document storage system such as 20, and one or more of attest data storage system such as 30 and 40, all of which are connected together through a network 60.

Each of the computer systems 10 and 50 has a document creating function for creating electronic documents (document bodies) by using a word processor software etc., a telecommunication function of transmitting/receiving the electronic documents with sufficient security using passwords etc., an authorizing function for authorizing the own electronic document by transmitting a signature data together with the document, and an output function for printing and displaying the image data including the electronic documents, the attest data and the bar codes of the attest data.

The document data storage system 20 stores electronic document data in the State created by the computer system 10 or 50, wherein each electronic document data stored in the system 20 includes an electronic document, signature image data to be used for the evidence for the approval of the electronic document by the signer, and an administrative number of the signature image data (or signer ID number) to be used for approval of the signature image data by the signer. The electronic document, the signature image and the signer ID number stored in the system 20 have the same form and shape as they were created in the computer system 10 or 50. The document data storage system 20 also attaches the attest data, read from the attest data storage system 30 or 40 based on the signer ID number, to the original electronic document, to thereby store the document data including the attest data.

More specifically, the document data storage system 20 attaches bar codes representing the signer ID number and the sequential usage number of the signature image data in the vicinity of the original signature image in the electronic document. This provides easy judgement of the signature data used in the electronic document. The document data storage system 20 further attaches the administrative number of the electronic document (document number) and bar codes representing the own system to form an electronic document data, and stores the electronic document data therein.

The document data storage system 20 has a function of safely transmitting/receiving the electronic document data to/from specified users through the computer systems 10 and 50, a function of storing the electronic document data and a function of receiving attest data from the attest data storage system 30 or 40 based on the approval supplied through the network 60 by the signer.

The attest data storage systems 30 and 40 store the attest data such as seal or signature image data used for the evidence of approval by an authorized individual person or corporate. The attest data storage systems 30 and 40, upon request from the individual authorized person or corporate, delivers the attest data together with the signer ID number used for verification of the attest data to the document data storage system 20.

The document data storage system 20 and the attest data storage systems 30 and 40 share the common signer ID numbers and the common document number.

In addition, the attest data storage systems 30 and 40 store the attest data supplied from the signer, and delivers the attest data together with the signer ID number to the document data storage system 20, upon request from the document data storage system 20 through the network 60, after the attest data storage system 30 or 40 obtains approval by the signer through the computer system 10 or 50 and the network 60.

Figure 2:
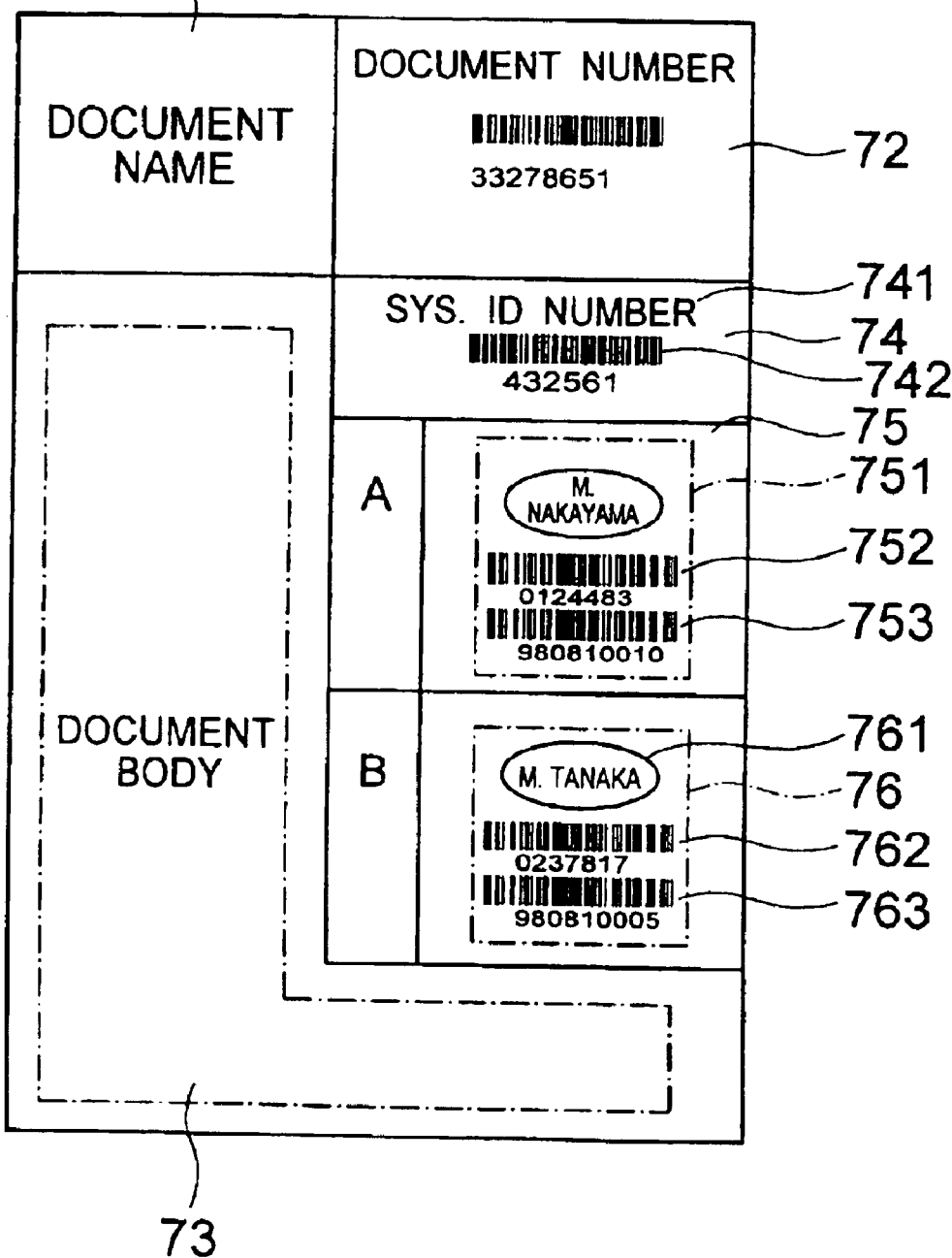
FIG. 2 is a schematic diagram for showing printed image of an electronic document data used in the management system of FIG. 1.

Referring to FIG. 2, there is shown an example a structure of an electronic document data stored in the document data storage system 20 and printed by the computer system 10 or 50, in the document management system of FIG. 1. The electronic document data 70 includes a first field 71 allocated to a document name of the electronic document, a second field 72 allocated to the document number of the electronic document and the bar codes thereof, a third field 73 allocated to the electronic document body which includes signature image of signers, a fourth field 74 allocated to the system ID number 741 and the bar codes 742 of the document data storage system 20, a fifth field 75 allocated to the first attest data for a first signer including the registered signature image data 751, and the signer ID number 752 and the serial usage number 753 of the first signer as well as the bar codes thereof, a sixth field 76 allocated to the second attest data for a second signer, which is similar to the first attest data and includes the registered signature image data 761, and the signer ID number 762 and the serial usage number 763 of the second signer as well as the bar codes thereof.

The document number is a serial number allocated by the document data storage section 20, the signer ID number is allocated by the attest data storage system 30 or 40, and the serial usage number represents the number of times for the signer to appear in the attest data storage system 30 or 40 for attesting the different documents.

Figure 3:
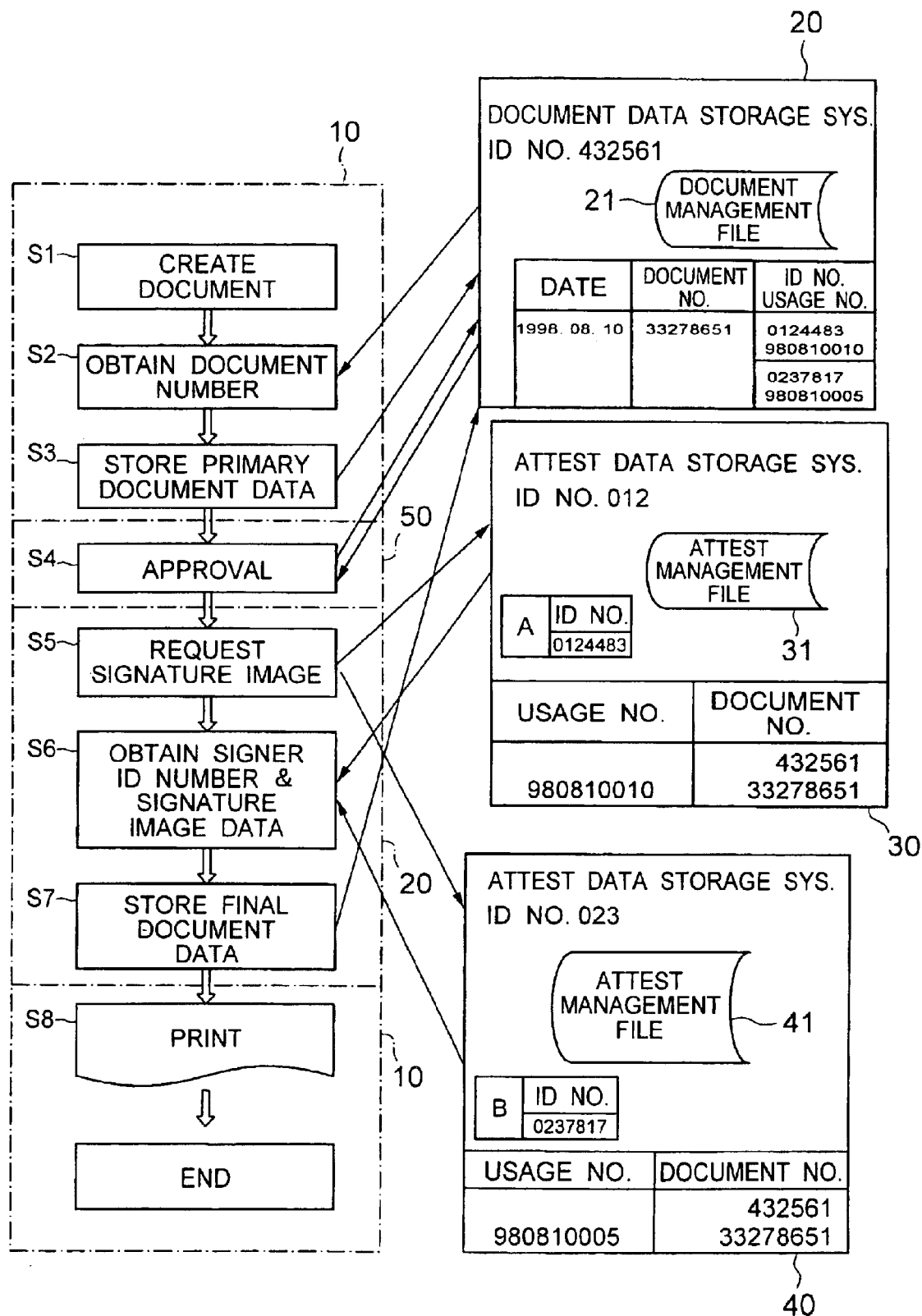
FIG. 3 is a schematic flowchart of the procedure executed in the management system of FIG. 1.

Referring to FIG. 3, there is shown a schematic flowchart of data processing in the document management system of FIG. 1. The data processing roughly includes the steps of receiving and storing an electronic document data by the document data storage system 20 from the computer system 10, receiving from the attest data storage systems 30 and 40 the attest data used for attesting the electronic document data by the document data storage system 20, and storing the attest data in the document data storage system 20 in association with the document data to complete the electronic document data.

The document data storage system 20, the attest data storage system 30 and the attest data storage system 40 have own ID numbers "432561", "012" and "023", respectively, in this example. The document data storage system 20 stores a document management file 21 which has a list tabulating the storage date of the electronic document, the document number, the signer ID number and the serial usage number by the signer. Each of the attest data storage system 30 and 40 stores an attest management file 31 or 41 which has a list tabulating the serial usage number by the signer and the document number in association with the ID number of the document data storage system 20 storing the corresponding document. The signature data can be used for the evidence of authorization for the document by the signer, and the document number and the serial usage number can be used for the evidence of the presence of the document data itself, which should be confirmed by the signer.

In operation, as shown in FIG. 3, after an electronic document is created by the first signer using the computer system 10 in step S1, the computer system 10 requests the document data storage system 20 to deliver a document number in step S2 for the new document. The computer system 10, aft receiving the document number, delivers the electronic document including signer ID numbers of the first and second signers together with own approval data as well as the document number, to the document data storage system 20, which stores the same in the form as it is received as a primary document data in step S3.

The document data storage system 20 then receives approval by the second signer using the computer system 50 through the network 60 as to the requisition of the approval data by the document storage system 20 in step S4 while informing the document number. Upon receipt of the approval, the document data storage system 20 requests in step S5 the attest data storage systems 30 and 40 to deliver the attest data stored therein.

When the attest data is requested from the document data storage system 20 in step S5, each of the attest data storage systems 30 and 40 confirms the document supplied from the document data storage system 20, stores the same, and then at step S6 delivers the signature image data as well as the signer ID number to the document data storage system 20 after the attest data storage system 30 or 40 receives approval from signer. The attest data storage systems 30 and 40 also store therein the document number at the delivery of the attest data and the signer ID number.

The document data storage system 20 receives the attest data including the signature image data and the signer ID number in step S6, and stores the received attest data in association with the ID numbers of the attest data storage systems 30 and 40 together with the barcodes thereof in the respective fields of the electric document data 70, thereby completing the electronic document data. The document data storage system 20 stores the completed document data in step S7 and delivers the same the signer's computer systems 10 and 50. The signer's computer systems 10 and 50 receive the electronic document data, stores the same, and prints the same in step S8 in the form shown FIG. 2.

In the above process, the document data storage system 20 stores the signature image data, and the signer ID number and/or the bar codes thereof in the vicinity of the signature data where the evidence of the approval can be easily confirmed. The signer ID number is also associated with the serial usage number representing the number of times the signer authorized the different documents.

A practical example for the operation of the document management system will be described next. In this example, the electronic document is a contract which needs inherently two signers including a first signer and a second signer, wherein the first signer creates the electronic document.

After the first signer creates a primary electronic document attached with the document number, the computer system 10 delivers the primary electronic document and receives the document number from the document data storage system 20.

The document data storage system 20 temporarily stores document management number of the received primary document in the second field 72, then receives approval by the second signer.

The document data storage system 20 then requests, based on the ID numbers of the signers recorded in the primary document, the attest data storage systems 30 to deliver the attest data. In this request, the document data storage system 20 delivers the ID number of the own system, document number and the primary document data.

The order of transmission of the requests is determined so that the attest data of the first signer is first requested, and the attest data of the second signer is then requested.

The document data storage system 20 obtains the attest data of the first signer from the attest data storage system 30 based on the approval by the first signer, then obtains the attest data of the second signer from the attest data storage system 40 based on the approval by the second signer.

Each attest data storage system 30 or 40 stores the serial usage number, the ID number of the document data storage system 20 and the document number in association with the ID number of each signer stored in the attest management file 31 or 41 of the each attest data storage system 30 or 40.

The attest data stored in each attest data storage system 30 or 40 includes the signature image data, ID number of the attest data storage system, the signer ID number, serial usage number and the bar codes of these data.

The document data storage system 20 completes the document data from the primary document data and stores the final document data in the document management file 21 in a protected way.

The contents of the document data can be accessed for examination and/or printing by the specified person allowed for accessing, or an unspecified person if so prescribed, through the network 60 by using a computer system.

In the above embodiment, since the signature image data is stored in the attest data storage systems separately from the document data, the data security can be improved. In addition, since each attest data or document data is attached with the ID number of the system storing the data, a quick data retrieval can be achieved. Further, the bar codes of the ID numbers assists the quick retrieval of the attest data or document data. The configuration of the separate independent systems 10 to 50 allows extensibility of the overall system to form an open-ended overall system with a higher security.

A modification of the management system of the above embodiments is as follows.

The creator of an electronic document obtains own temporary attest data from the attest data storage system 30, for example, when the creator completes the electronic document body. At this stage, the attest data storage system 30 does not receive the ID number of the document data storage system 20 and the document number.

After the document data storage system 20 receives the primary document data, transmission of the ID number of the systems 20 and 30 and document number are executed between the document data storage system 20 and the attest data storage system 30 without an approval by the creator of the document. This affords a simpler procedure of the attest management.

In the configuration of the above embodiment, since the attest data storage systems 30 and 40 are provided separately from the document data storage section 20 and coupled thereto by a network and the creator of the electronic document temporarily stores the primary document data in the document data storage system 20, the document data storage system 20 can obtain the attest data from the attest data storage systems 30 and 40 and store and handle the signer ID number and the document number while cooperating with the attest data storage systems 30 and 40.

The attest data management system of the present invention can be used for authorizing a variety of electronic document data including ordinary document within a corporate, and electronic money (digital cash), credit card, electronic commerce, electronic banking system etc.

Since the above embodiments are described only for examples, the present invention is not limited to the above embodiments and various modifications or alterations can be easily made therefrom by those skilled in the art without departing from the scope of the present invention.

For example, a single signer ID number need not be allocated to a signer, and a plurality of ID numbers may be allocated to each signature image among a plurality of signature images used by the signer. If any number or code can be used for identification of the signature image, the number or code may be used as the signer ID number in the present invention.

What is claimed is:

1. A document management system comprising:
    (a) a document data storage system;
    (b) a plurality of attest data storage systems; and
    (c) a plurality of computer systems, each operating as a terminal, the document data storage system, the plurality of attest data storage systems and the plurality of computer system being coupled together on a network securely coupled to outside the network,
    the document data storage system having an ID number associated therewith, the document data storage system storing and managing an electronic document and, for any stored electronic document, storing a document number associated with the document, and attest data, the attest data comprising signature image data, a signer ID number, an ID number of the attest data storage system associated with the document, and a serial usage number relating to the document,
    wherein, when a person utilizing one of the computer terminals, and authorized to access the document data storage system and the electronic document, requests a display or printing of image data of the document, the document data storage system displays or prints data of a total image of the requested electronic document, the total image comprising the electronic document, a document name, the document number, the ID number of the document data storage system, as well as attached bar codes representing said document and ID numbers, one or more signature images, the signer ID number including the ID number of the attest storage system, the serial usage number of the signature image data, and attached bar codes representing said numbers in the vicinity of the original signature image,
    wherein, for a document to be signed by plural signers, the attest data and electronic document are registered in accordance with the following procedure:
    (a) a first one of the plurality of computer systems securely provides a first signer with his/her signer ID number, which includes the ID number of the attest data storage system, and allowing the first signer to register an image data of his/her own signature or seal in the attest data storage system as a signature image data representing his/her approval, the signature image data being registered in the attest data storage system, with the signer ID number, and the signature usage number,
    (b) the first computer system accesses the document data storage system securely and requests delivery of a document number for the new electronic document,
    (c) the document data storage system supplies the requested document number and stores the document and a set of planned signer ID numbers temporarily,
    (d) the document data storage system delivers the electronic document, having attached thereto the ID number of the document storage system, the document number, all planned signer ID numbers, to the attest data storage systems associated with the attached signer ID number and requests the signature image data,
    (e) upon receipt of the request of attest data from the document data storage system, each of the attest data storage systems, after confirming the signer's approval for the document supplied from the document data storage system, creates the serial usage number of the signature image data, and stores the ID number of the document storage system and the document number in connection with the serial usage number of the signature image data and the signer ID number which includes the attest data storage system ID number, and then delivers the signature image data, the signer ID number and the serial usage number of the signature image data to the document data storage system,
    (f) after receipt of all planned signers'signature image data, the document data storage system stores the electronic document data, as a completed document, and stores together with the plural signature image data, the signer ID numbers and the serial usage numbers of the signature image data in connection with the document data number, together with barcodes.

2. The document management system according to claim 1, wherein:
    the document data storage system, after obtaining the signer's approval, requests the attest data storage systems to deliver the attest data stored therein;
    each attest data storage system securely stores and manages the attest data used for evidence of approval by an authorized individual person or corporation; and
    a signer who is the owner of a signature or seal, can register with the attest data storage system beforehand securely his/her own signature image data as evidence of formal approval, such that it is impossible for others to register or change the registered attest data, the attest data of the signer comprising the signature image data, the signer ID number, the ID number of the attest data storage system and the serial usage number created when signer approves the document.

3. The document management system according to claim 1, wherein the serial usage number includes the date information.

4. The document management system according to claim 1, wherein:
    the attest data storage system on which attest data for the document is stored;
    (a) records the approved document numbers, the ID number of the document storage system and the serial usage number, with reference to each signature image data; and
    (b) delivers the attest data together with the signer ID number to the document data storage system, upon receipt of a request over the network from the document data storage system, after having received, over the network, approval from the signer using the computer system.

5. The document management system according to claim 4, wherein each of the computer systems has an electronic document creating function for creating a document body, a telecommunication function for securely transmitting/ receiving the electronic documents, an authorizing function for authorizing an electronic document by transmitting signature data together with the document, and an output function for printing and displaying said total image data of the requested electronic document.

6. The document management system as defined in claim 1, wherein a person securely accesses the document data storage system and the attest data storage system using one of the plurality of computer systems coupled together on the network, and inputs a barcode associated with a desired document number using a barcode reader to read and input data to the document management system, display and printing of the document being effected in response to; an input of the signer ID number and the serial usage number using the barcode reader; and an input of that data to the attest data storage system.

7. The document management system as defined in claim 1, wherein the document storage system ID number, the document number, the signer ID number, and signature usage number are expressed by bar codes, allowing verification of the document and signature by a bar code reader or scanner or digital camera connected to the computer system through the network, the computer system being operable to recognize automatically the barcode and access and verify the appropriate document storage system and attest data storage system.

8. The document management system as defined in claim 1, wherein the person who registered the signature image data or seal image in the attest data storage system accesses to the system securely using one of the plurality of computer systems connecting the network using the signer ID number and a password so the system can display usage records of the signature image data, and the approved electronic document.

* * * * *